(12) United States Patent
Christian

(10) Patent No.: US 7,414,783 B2
(45) Date of Patent: Aug. 19, 2008

(54) APPARATUS FOR THE OPTICAL MANIPULATION OF A PAIR OF LANDSCAPE STEREOSCOPIC IMAGES

(76) Inventor: John Alexander Christian, 5 Towers Way, Corfe Mullen, Wimborne, Dorset, BH21 3UA (GB)

( * ) Notice: Subject to any disclaimer, the term of this patent is extended or adjusted under 35 U.S.C. 154(b) by 0 days.

(21) Appl. No.: 10/181,507

(22) PCT Filed: Jan. 24, 2001

(86) PCT No.: PCT/GB01/00265

§ 371 (c)(1),
(2), (4) Date: Jul. 18, 2002

(87) PCT Pub. No.: WO01/56301

PCT Pub. Date: Aug. 2, 2001

(65) Prior Publication Data

US 2002/0186466 A1    Dec. 12, 2002

(30) Foreign Application Priority Data

Jan. 26, 2000    (GB)  ................................ 0001835.8

(51) Int. Cl.
*G02B 27/24* (2006.01)
*G02B 27/22* (2006.01)

(52) U.S. Cl. .................. 359/472; 359/462; 359/464
(58) Field of Classification Search .............. 359/462, 359/464, 466, 467, 471, 472, 480, 376, 377, 359/378, 469, 861; 348/52; 352/60; 396/324, 396/327

See application file for complete search history.

(56) References Cited

U.S. PATENT DOCUMENTS

| | | | | |
|---|---|---|---|---|
| 3,019,698 A | * | 2/1962 | Sheldon | 352/60 |
| 3,825,328 A | * | 7/1974 | Hoch | 359/462 |
| 5,119,234 A | * | 6/1992 | Van Der Walt | 359/472 |
| 5,596,363 A | | 1/1997 | Christian | 348/58 |
| 5,943,165 A | * | 8/1999 | Huang | 359/472 |
| 5,964,696 A | | 10/1999 | Mihalca et al. | |
| 6,108,130 A | * | 8/2000 | Raj | 359/462 |

* cited by examiner

*Primary Examiner*—Audrey Y Chang
(74) *Attorney, Agent, or Firm*—Iandioro Teska & Coleman

(57) ABSTRACT

Apparatus (2) for the optical manipulation of a pair of landscape stereoscopic images, which apparatus (2) comprises a housing (4), and optical re-orientation means (6) positioned in the housing (4) and for re-orienting the pair of landscape stereoscopic images between a first orientation required for human viewing and a second orientation required for recording with a single camera or for reproduction from a single screen.

8 Claims, 7 Drawing Sheets

APPARATUS FOR THE OPTICAL MANIPULATION OF A PAIR OF LANDSCAPE STEREOSCOPIC IMAGES

FIELD OF THE INVENTION

Background of the Invention

This invention relates to apparatus for the optical manipulation of a pair of landscape stereoscopic images.

Normal human eye sight is stereoscopic. This means that the human brain is able to judge the distance to an object by comparing differences between the images captured by each eye from different positions. Eye separation is typically 63 mm but the ability to interpret relative distances is still maintained when this image capture separation distance is artificially increased, for example as with binoculars, or is artificially reduced, for example as with a microscope or an endoscope.

Stereoscopic images have been captured historically by the use of two cameras and complex means for directing the resulting images separately to each eye. In some cases, separate but linked projectors have been used together with polarising spectacles in order to segregate the images superimposed on a screen. A variation on this, usually employed for video purposes, is to show left and right images alternately to the same camera. The images alternate in time and/or as strips across a screen, either horizontally or vertically. All of these known systems have an adverse affect on image quality, unless additional complications are included by way of memory to fill in the gaps for each of the stereoscopic images. Such additional complications require dedicated and complicated electronics, which must also direct the assembled components of each image to the appropriate human eye.

A passive optical system is known from United Kingdom Patent No. 2,236,198. In this patent, landscape shaped images from separate lenses are reorientated such that each image fills half the area of view of a single camera simultaneously, and without the images having their proportions compressed along one axis. Essentially, the images are rotated 90° anti-clockwise in their own plane and shown to a single camera with their longest sides adjoining. When displayed on a television or monitor screen, this means that every scan line, field and frame contributes to both images. In most electronic stereoscopic viewing systems, this is not true. A television screen is normally scanned on alternate lines (field 1) followed by the in-between lines (field 2), and many electronic stereoscopic viewing systems devote one field to the left eye and the other field to the right eye. These known electronic stereoscopic viewing systems are described as field sequential viewing systems. Flicker is a known complication as the images alternate when displayed to each eye in turn. Two consecutive fields on monoscopic television make up a whole frame.

Passive optical viewing apparatus is disclosed in United Kingdom Patent No. 2,283,877. Whilst this is a considerable improvement on many known types of stereoscopic viewing apparatus, the apparatus of the United Kingdom Patent No. 2,283,877 has its images rotated through 90° which require images viewed, for example, on a television, to be such that the television has to be rotated through 90°. This can be inconvenient.

SUMMARY OF THE INVENTION

It is an aim of the present invention to obviate or reduce the above mentioned problem.

Accordingly, the present invention provides apparatus for the optical manipulation of a pair of landscape stereoscopic images, which apparatus comprises an enclosed housing, three ports in the housing with one port forming a photographic interface and the other two ports forming a human interface, said ports allowing light to pass from the human interface to the photographic interface for camera recording, or from the photographic interface, to the human interface for each eye, of a human without image inversion between the photographic interface and the human interface; said apparatus being characterised by four reflective surfaces which direct light along three mutually perpendicular directions, each of said surfaces having an edge lying on a flat common plane, said plane also including a division line between adjacent landscape stereoscopic images presented at one said interface, such that light emerges from one said interface in a direction parallel to that of light entering the other said interface, whereby the apparatus causes the landscape stereoscopic images which are side by side with a left eye image left of a right eye image and with the shortest dimension of the landscape images adjacent and which are at the human interface to become stacked one image above the other at the photographic interface.

The apparatus of the present invention is such that images can be viewed without having to rotate the image source through 90°.

The apparatus of the present invention may include a first optical path for conveying a first one of the pair of landscape stereoscopic images, and a second optical path for conveying a second one of the pair of landscape stereoscopic images.

The apparatus of the present invention may be one in which the optical re-orientation means re-orientates one of the pair of landscape stereoscopic images such that the landscape stereoscopic images are side by side in landscape format at a first end of the first and the second optical paths, such that the landscape stereoscopic images are on top of one another at a second end of the first and the second optical paths, and such that the landscape stereoscopic images are the same way up at the first and the second ends of the first and the second optical paths. The optical paths may be any suitable and appropriate optical paths including relay lens optical paths and fibre optic optical paths.

Preferably, the optical re-orientation means comprises four reflective surfaces. This enables two lateral inversions of each image between the display device and the eyes unless one of the images is seen directly. One of the two lateral inversions may be by electrical means.

The apparatus may be one in which the optical re-orientation means comprises a first one of the reflective surfaces for reflecting one of the landscape stereoscopic images upwardly, a second one of the reflective surfaces for reflecting the image from the first reflective surface towards the second end of the first and the second optical paths, a third reflective surface for reflecting the image from the second reflective surface towards and above the one of the landscape stereoscopic images that has not been re-orientated, and a fourth reflective surface for reflecting the image from the third reflective surface towards the second end of the first and the second optical paths and parallel with and above the one of the landscape stereoscopic images that has not been re-orientated.

Preferably, the four reflective surfaces are four prism surfaces. Other types of reflective surfaces may be employed so that, for example, the reflective surfaces may be parts of mirrors.

In an alternative embodiment of the invention, the optical re-orientation means may include three reflective surfaces off which at least one of the landscape stereoscopic images is sequentially reflected, and electrical image-reversal means for providing a screen output as a mirror image. If desired, the apparatus may include flat panel display means, and in which the steroscopic pair of images from a flat panel display on the flat panel display means are able to be superimposed and segregated by passive polarising spectacles, despite the display panel having inbuilt polarisation opposite to that required for one of the two images.

In a further embodiment of the invention, the polarising filters may be omitted from the display screen, and a lenticular overlay used instead in order to cover a matrix of optical fibres where the light emerges. This is to enable stereoscopic viewing by means of angular separation of the images, without the use of spectacles. In order to exploit the lenticular overlay, vertical strips of each image alternate across the fibre optic matrix. The same arrangement may be used for use with polarising spectacles, which do not provide the same restrictions on viewing position, but in this case light has to be polarised for the images in opposite senses.

The apparatus for the present invention may find application in a wide variety of fields including medical fields, industrial fields, and media fields. Thus, the apparatus of the present invention may be produced in the form of a stereoscopic endoscope, a professional video set-up and home stereoscopic recording system, in pick-and-place manufacturing systems, in ophthalmic apparatus, and in live camera projection apparatus. The apparatus of the present invention is compatible with television systems broadcasting using a single unmodified analogue or digital video channel. The apparatus of the present invention is also compatible with the internet.

As mentioned above, one example of an industrial application of the apparatus of the present invention is that of an endoscope. Endoscopes are widely used by surgeons. The surgeons frequently operate through minimum size apertures in order to speed the healing process of a patient, in what is often called keyhole surgery. In order to do this, the surgeons need to see inside the patient's body. Tubular instruments which can bring out such images are called endoscopes. The known endoscopes may be rigid or flexible depending upon their intended use. The known endoscopes may have a diameter of only a few millimetres. A camera may operate from inside the endoscope, or an image may be conveyed along the endoscope by optical means from inside the patient to a camera head controlled directly by the surgeon. Results may be viewed on a monitor screen. The known endoscopes give monoscopic images which do not allow a surgeon the benefit of depth and distance perception since both eyes receive the same image. Many attempts have been made to bring stereoscopic views to the surgeon by following the above mentioned electronic image switching principles. These attempts have given rise to a common problem in that the images alternate in various ways and soon become tiring. With the apparatus of the present invention in the form of an endoscope, stereoscopic images are able to be conveyed along the endoscope by two optical paths and they are able to be re-orientated, for presentation to a single camera simultaneously. On a conventional display tube, every line, field and frame contributes to both images.

The two optical channels may be in the form of rod lenses inside a tube where positive and negative lenses share the same focus. Repeat pairs in series along the length of a rigid endoscope may maintain the size of the image, each in a similar fashion to a telescope. The two optical paths may alternatively comprise two coherent bundles of optical fibres which are flexible. Pin prick samples of an image from inside a patient may be kept in the same relative positions as they are conveyed to the other end of the endoscope arriving in the manner of pixels on the face of a display screen.

In either a rigid or flexible endoscope in accordance with the present invention, the images are shown one above the other (instead of side by side) to a single camera which is rotated 90° clockwise in order to capture the combined shape of the two images. Once captured by the camera, the images may be conveyed to a single monitor, television or projector. The apparatus of the present invention in the form of an endoscope is advantageous over known endoscopes insofar as it provides separate stereoscopic images from two optical channels which are shown to a single camera simultaneously, each occupying half the area of view, such that on a conventional television or monitor tube every line, field and frame contributes to both images. Most alternative viewing systems are based on field sequential viewing as mentioned above so that the images in whole or in part alternate. Memory storage and other complications are necessary in order to reduce the effects of flicker.

In its endoscope form, the apparatus of the present invention may be used with analogue, digital or film systems. A surgeon or other user does not require a completely new set of equipment. A known monoscopic endoscope may be replaced by a stereoscopic one in accordance with the present invention on the same medically approved camera. The addition of passive optical re-orientation of the medical monitor screen output then permits the surgeon to view stereoscopically through passive polarising spectacles which segregate the superimposed images. The endoscope user may still see normally when looking away from the screen. Electronically switched viewing systems interfere with normal vision. For example there may be a beat frequency with the mains lighting.

A monitor without a stereoscopic viewer attachment will display physically separate images. Electronic stereoscopic displays show an unwatchable mixture of images if the viewing segregation mechanism is absent.

BRIEF DESCRIPTION OF THE DRAWINGS

Embodiments of the invention will now be described solely by way of example and with reference to the accompanying drawings in which.

DETAILED DESCRIPTION OF THE DRAWINGS

Figure 1:
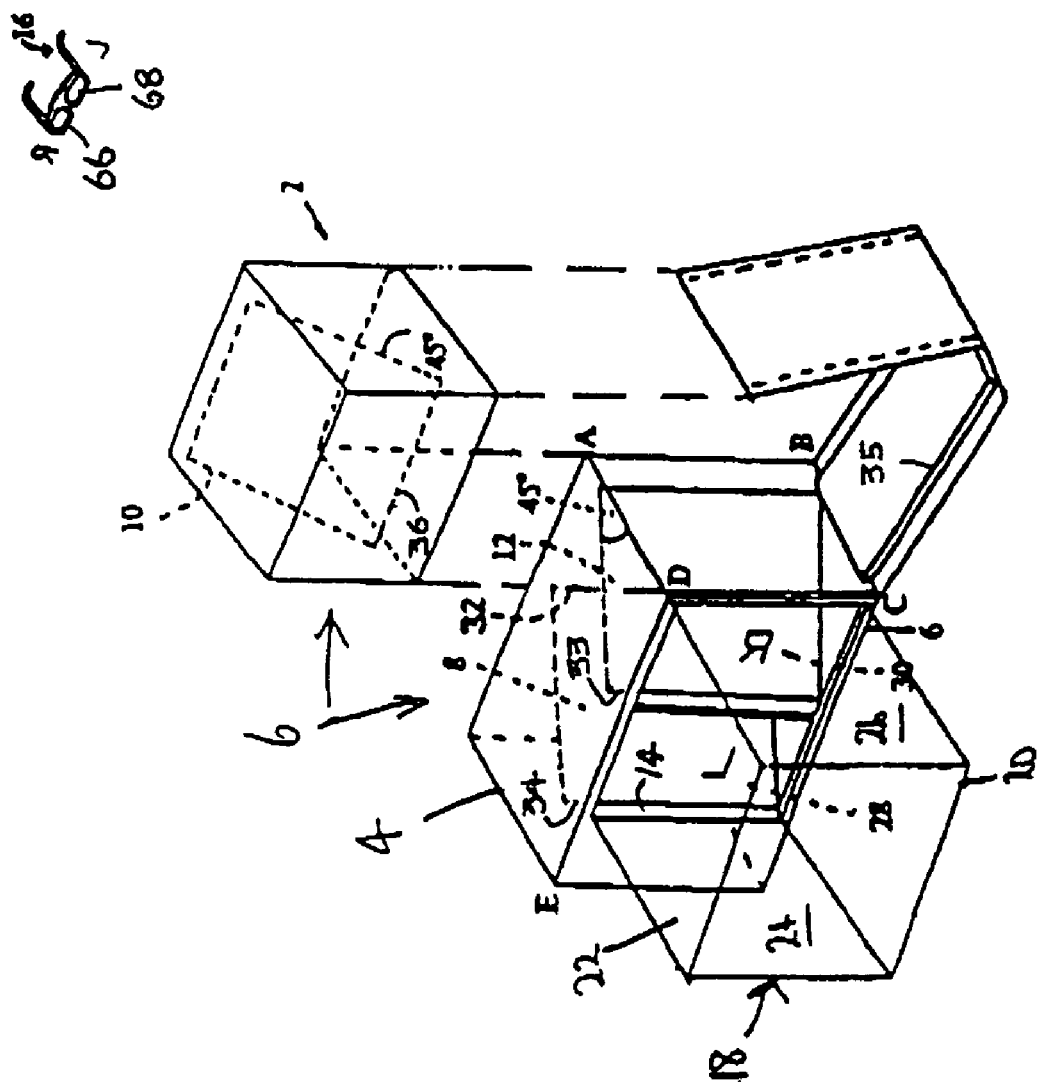
FIG. 1 shows first apparatus of the invention for the optical manipulation of a pair of landscape stereoscopic images.

Referring to FIG. 1, there is shown apparatus for the optical manipulation of a pair of landscape stereoscopic images. The apparatus 2 comprises a housing 4 which is shown in exploded form for ease of understanding. The apparatus 2 also comprises optical re-orientation means 6 which is positioned in the housing 4 and which is for re-re-orientating the pair of landscape stereoscopic images between a first orientation required for human viewing and a second orientation required for recording with a single camera or for reproduction from a single screen, the single screen being such that it has a first pair of sides which are shorter than a second pair of sides. The second re-orientation is also such that there is no top to bottom inversion of one of the landscape stereoscopic images with respect to the other one of the landscape stereoscopic images. The second orientation is further such that the stereoscopic landscape images can be rotated for display in each of two halves of the single screen such that the longest sides of the stereoscopic landscape images are parallel with the first pair of sides of the screen, thereby maintaining a good aspect ratio without the need for compression or stretching of the pair of landscape stereoscopic images.

The optical re-orientation means 6 is further such that the pair of landscape stereoscopic images leave the optical re-orientation means 6 in a direction which is parallel to a direction in which the pair of landscape stereoscopic images enter the optical re-orientation means 6.

As can be seen from FIG. 1, the optical reorientation means 6 comprises two mirrors 8, 10 which just reflect light, and a mirror 12 which both reflects and transmits light. The mirror 12 is a half silvered mirror which reflects substantially 50% of the light and which transmits substantially 50% of the light. The optical reorientation means 6 further includes polarising filters in a polarising frame 14 and polarising spectacles 16. The mirror 12 may have a metal or metallic-type material other than silver for giving the 50% reflection and the 50% transmission of the light. The polarising frame 14 forms a photographic interface.

As can be seen from FIG. 1, images are viewed via the polarising spectacles 16 from a television 18 having a base 20, a top 22 and sides 24, 26. The television 18 is thus standing in a normal upright manner with its screen facing the housing 4. The polarising spectacles 16 have a right eye port 66 and a left eye port 68.

The mirror 12 is positioned between the mirror 8 and the mirror 10. A first polarising filter 28 is positioned in the polarising frame 14 such that it is between the television screen and the mirror 8. A second and contrastingly polarised filter 30 is positioned in the polarising frame 14 such that it is between the television screen and the mirror 12. A third polarising filter may advantageously be included which is perpendicular to the first and second filters and whose plane passes through their dividing line. This third filter device may be necessary where a screen is already polarised across its whole area. In this case a 90° phase shift becomes necessary for the left eye image, achieved for example by passing it through a circular polariser followed by a linear one.

The mirror 8 is hinged about an edge 32, allowing the viewing apparatus to adapt for a smaller screen size. The mirror 12 makes an angle of 45° as shown. Mirror edges 33, 34, 35, 36 are contained in a flat common plane. There is a division between the images R, L in the common plane.

Figure 2:
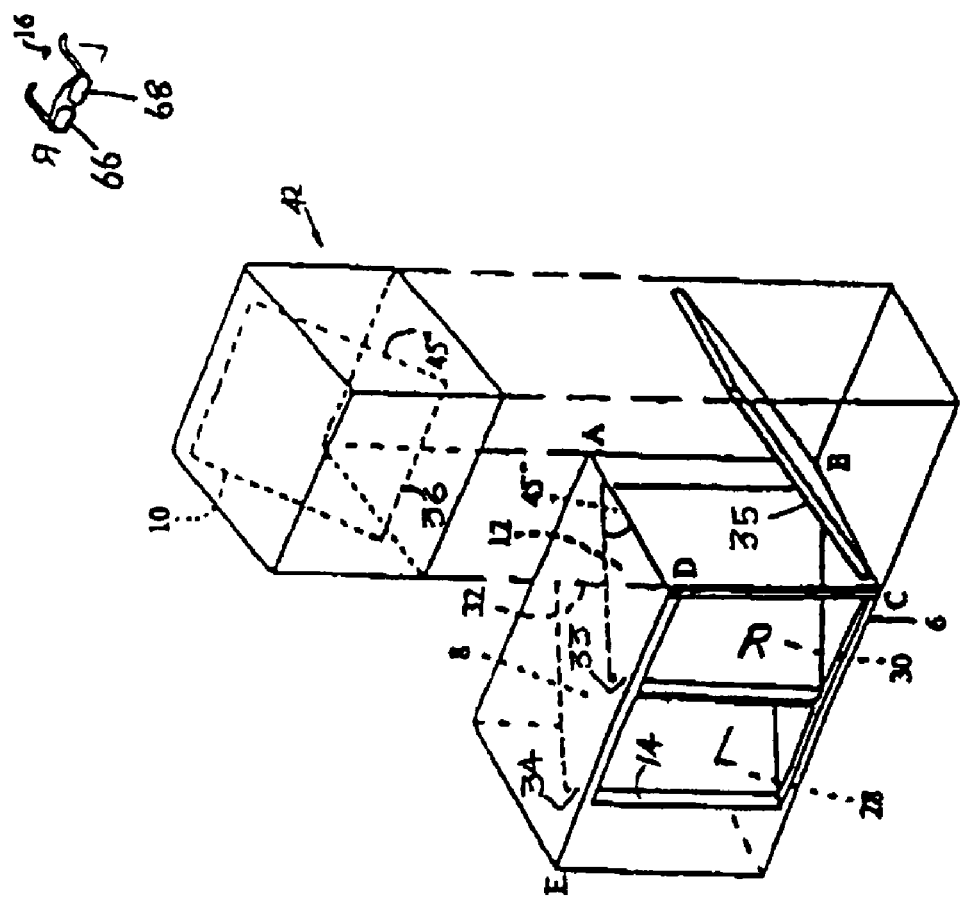
FIG. 2 shows second apparatus of the invention for the optical manipulation of a pair of landscape stereoscopic images.

Referring now to FIG. 2, there is shown second apparatus 42 which is similar to the apparatus 2 shown in FIG. 1. Similar parts have been given the same numerals for ease of comparison and understanding. The apparatus 42 is slightly more compact than the apparatus 2.

In both the apparatus 2 and the apparatus 42, it will be appreciated that the light path of the original image has been folded to avoid the need for rotating the display screen.

In both the apparatus 2 and 42, the upper mirror 10 may advantageously be hinged about its upper edge. Slight adjustment of its normal 45° angle then facilitates viewing from a variable vertical position.

A vertical swivel axis through the centre of the mirror 10 and the mirror beneath it may facilitate directing the stereoscopic view horizontally.

The viewing surface of the mirror 10 enclosure may usefully be a sheet of anti-reflection coated glass or coated plastic (not shown). This provides some mechanical protection for the optics, excludes dust, and reduces spurious reflections from external light sources.

Figure 3:
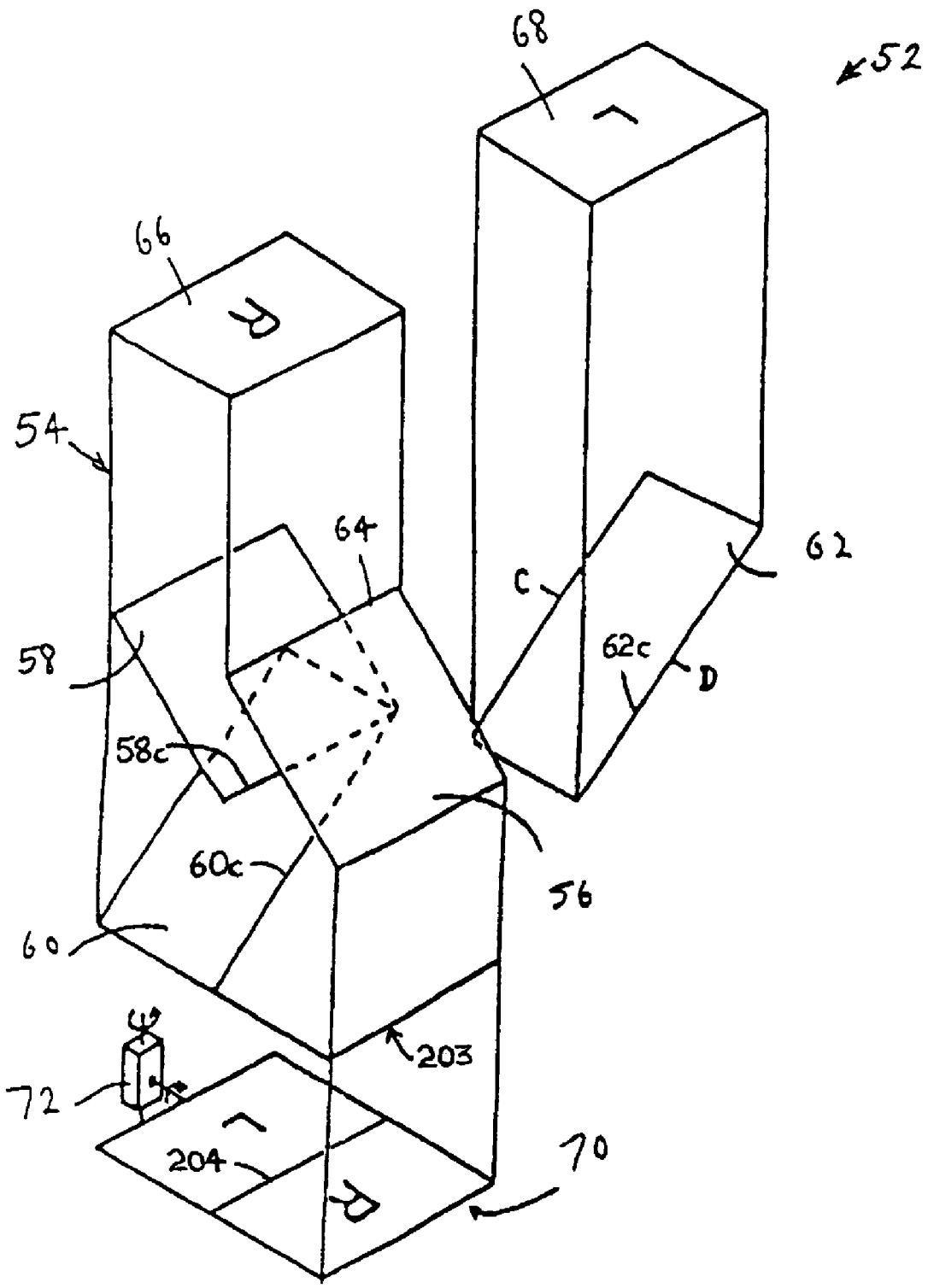
FIG. 3 shows third apparatus of the invention for the optical manipulation of a pair of landscape stereoscopic images.

Referring now to FIG. 3, there is shown third apparatus 52 for the optical manipulation of a pair of landscape stereoscopic images. The apparatus 52 comprises a housing 54 which is shown in exploded form for ease of understanding. The housing 54 contains four mirrors 56, 58, 60 and 62 which direct light alone three mutually perpendicular axes R, 56; 56, 58; 60, 62. The mirrors 56, 60 are both mounted with their reflecting surfaces angled downwardly. The mirrors 58 and 62 are both mounted with their full reflecting surfaces angled upwardly. The mirror 56 may be rotatable about its upper edge 64 to enable stereoscopic viewing of a smaller picture display panel. The four mirrors 56, 58, 60, 62 each have one edge 64, 58c, 60c, 62c in a flat common plane. The common plane passes through a division 204 between the pair of landscape stereoscopic images.

The mirror 62 may be rotated about a horizontal axis CD or, alternatively, its enclosure distance from a right eye arrangement 66 may be changed to facilitate a human brain merging the images from the right eye arrangement 66 and a left eye arrangement 68 for eye separations which differ. The axis CD may coincide with upper or lower horizontal mirror edges, or be intermediate.

The apparatus 52 is shown in exploded form for clarity. In practice, the apparatus 52, as with the apparatus 2 and 42, needs to exclude light from entering the eyes from anywhere but the appropriate part of the apparatus, in common with monoscopic use of a view finder. The optical re-orientation means need to be enclosed, usually with the appropriate use of eye cups. Internal non-reflective surfaces may be matt black. A vertical partition of the images may be essentially opaque and it may extend to the height and width of the mirror 60.

As can be seen from the lower part of FIG. 3, the pair of landscape stereoscopic images are marked L, R and, they are provided on a screen 70 with a two-axes swivel mounting 72 by a camcorder (remainder not shown). There is a photographic interface 203. The camera display screen is able to show such a pair of images by means of an optical manipulation camera attachment to the lens described in United Kingdom Patent No. 2,236,198. As can also be seen from FIG. 3, the images L, R are able to be seen one above the other, with the apparatus 52 enabling each image L, R to be directed separately to the appropriate eye, at the right eye arrangement 66 and the left eye arrangement 68, this being in the manner of looking downwards into a pair of binoculars.

The apparatus 52 offers the choice of viewing with or without polarising glasses 16. Glasses are no advantage in this case.

The apparatus may be used with 180° rotation in principle, so that the eye pieces become swopped over. The right eye image would be directly beneath the left eyepiece, instead of the left eye image on the screen being below the right eyepiece as shown in FIG. 3.

Figure 4:
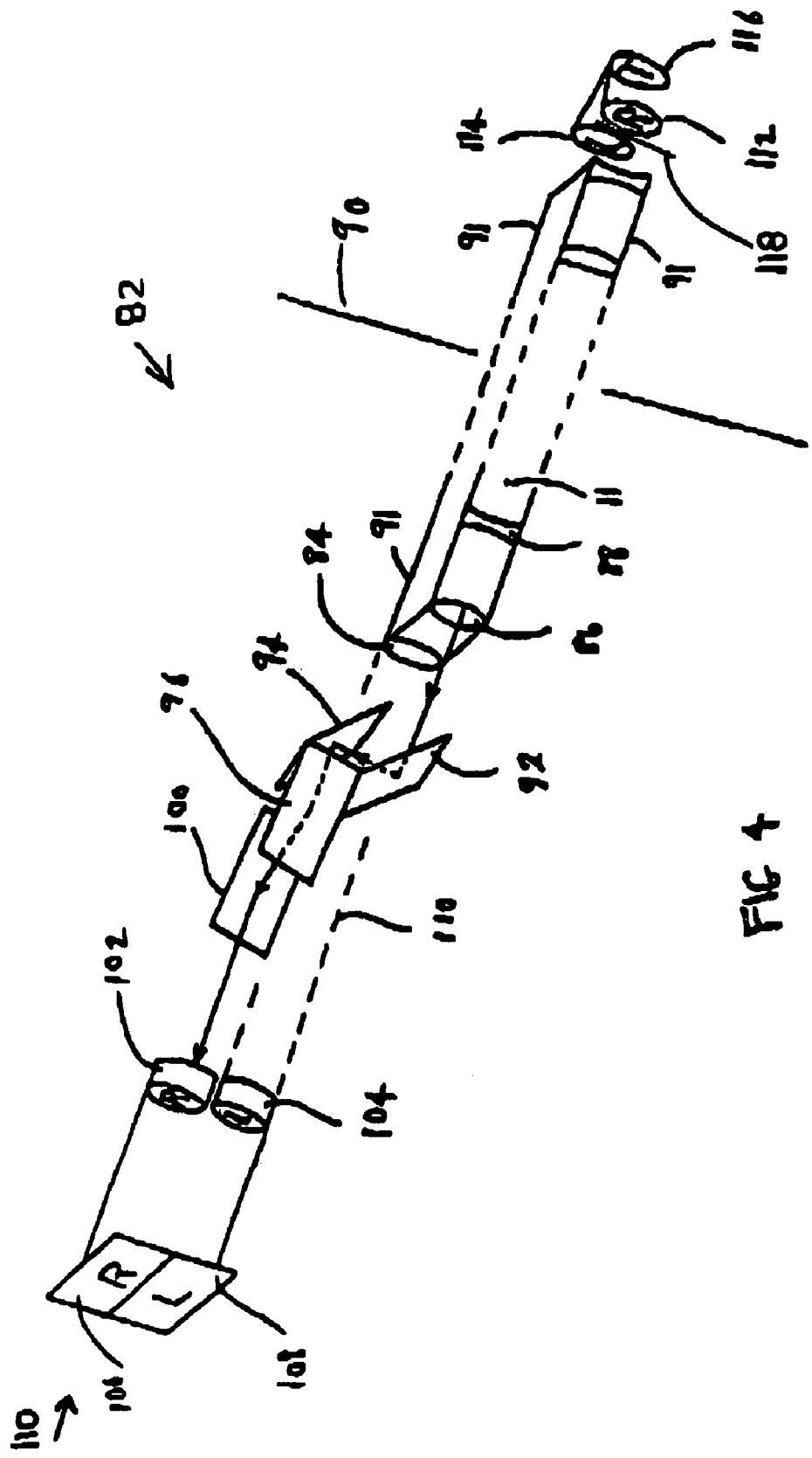
FIG. 4 shows a fourth apparatus of the invention for the optical manipulation of a pair of landscape stereoscopic images.

Referring now to FIG. 4, there is shown apparatus 82 for the optical manipulation of a pair of landscape stereoscopic images. The apparatus 82 is in the form of an endoscope.

The apparatus 82 comprises an optical channel positive lens element 84 for the left eye view, and an optical channel positive element 86 for the right eye view. There is also an optical channel negative lens element 88 for the right eye view. A patient's body is shown schematically as body surface 90 and it will be seen that the right hand end of the apparatus 82 is in the patient, whilst the left hand end of the apparatus 82 is outside the patient.

The apparatus 82 further comprises a prism reflective surface 92 for the right eye view. This prism reflective surface 92 gives a first reflection which is upwards.

The apparatus 82 further comprises a prism reflective surface 94 for the right eye view. This prism reflective surface 94 gives a second reflection which is directed towards the surgeon. A prism reflective surface 96 for the right eye view gives a third reflection which is directed across and towards the left eye view optical axis, but above it. A prism reflective surface 100 for the right eye view provides a fourth reflection which is directed parallel to the left eye view channel, but directly above it. Reflective surface edges which are contained in a common plane are the far side sloping edges of prism reflective surfaces 92 and 94, the left vertical edge of prism reflective surface 96, and the right vertical edge of prism reflective surface 100.

The same re-orientation of the two images could be achieved by using a coherent bundle of optical fibres to relocate the right eye image above that of the left eye. Pin prick samples of an image are preserved in the same relative positions, in the manner of pixels on a screen, when a coherent bundle of fibres relocates an image. The fibre bundle "S" shape would replace the four reflective surfaces.

Also shown in FIG. 4 are a positive lens element 102 at the camera end of the right eye view channel, and a positive lens element 104 at the camera end of the left eye view channel. A common focus 11 is shared by the relay elements 86, 88. The magnification is given by the ratio of the focal lengths.

The right eye view 106 and the left eye view 108 are captured simultaneously by a single camera. A photographic interface occurs where the images meet the camera.

The reference numeral 110 is shown as a discontinuous line in the left eye view purely for clarity. The left eye channel is in principle a straight monoscopic endoscope.

The reference numeral 112 indicates a right eye view (i.e. a right eye port) from the bottom patient end of the apparatus 82. The reference numeral 114 illustrates the left eye view (i.e. a left eye port) from the bottom patient end of the apparatus 82. A common target 116 is shown being viewed by both the left and right eyes. The optical axes are made to converge on the common target 116.

Optical relays in the form of pairs of lenses are represented at both ends of the right eye channel to illustrate the principle. In reality, the optical relays may consist of standard endoscope rod lenses which repeat along the length of the endoscope.

Because the apparatus 82 shown in FIG. 4 is in the form of an endoscope, illumination would normally be required to be directed down the endoscope, for example by optical fibre bundles (not shown). The required illumination may be fed in from the side of the apparatus 82. A camera lead (not shown) may come in from the left of the apparatus 82.

Figure 5:
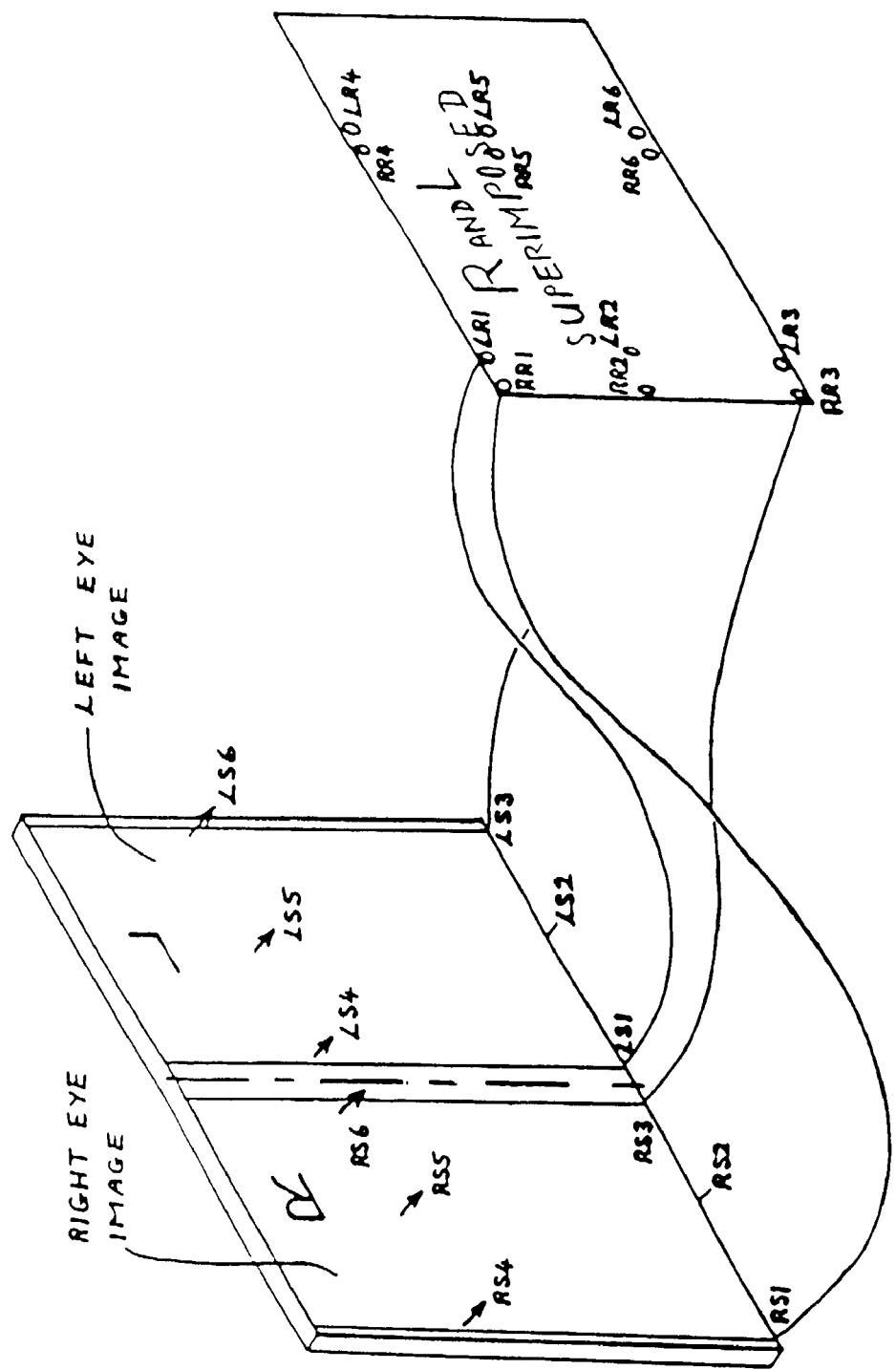
FIG. 5 shows fifth apparatus of the invention and more especially shows an example of optical re-orientation of a pair of screened images by means of optical fibres, enabling image segregation by either an angular displacement overlay matrix or polarisation filters.

Referring to FIG. 5, there is shown how polarising filters may be omitted from the display screen by using a lenticular overlay. The lenticular overlay is used to cover a matrix of optical fibres where the light emerges. This is to enable stereoscopic viewing by means of angular separation of images, without the use of spectacles. A flat common plane coincides with all the fibre terminations on the left side of FIG. 5.

In order to exploit the lenticular overlay, vertical strips of each image alternate across the fibre optic matrix. The same arrangement may be used for use with polarising spectacles which do not provide the same restrictions on viewing position, but in this case light has to be polarised for the images in opposite senses. Polarisation filters may be applied either to the face of the display screen or in alternately opposite senses to columns of the fibres at the light output end. The first, last and an intermediate fibre are illustrated in example columns in FIG. 5 For example, the first column of picture elements for the right eye image is adjacent to the first column of picture elements for the left eye image.

FIG. 5 shows examples of optical fibre routing. Thus, for a vertical strip down the left hand side of the right eye image, light entering a fibre at RS1 emerges at RR1. Similarly, for the left eye image, light emerges immediately adjacent at LR1. Further across the picture, light entering at RS5 emerges at RR5 adjacent to the corresponding part of the left eye image LR5. This form of image manipulation has the advantage of acting in line with a screen which does not have to be displaced from its monoscopic viewing position.

Figure 6:
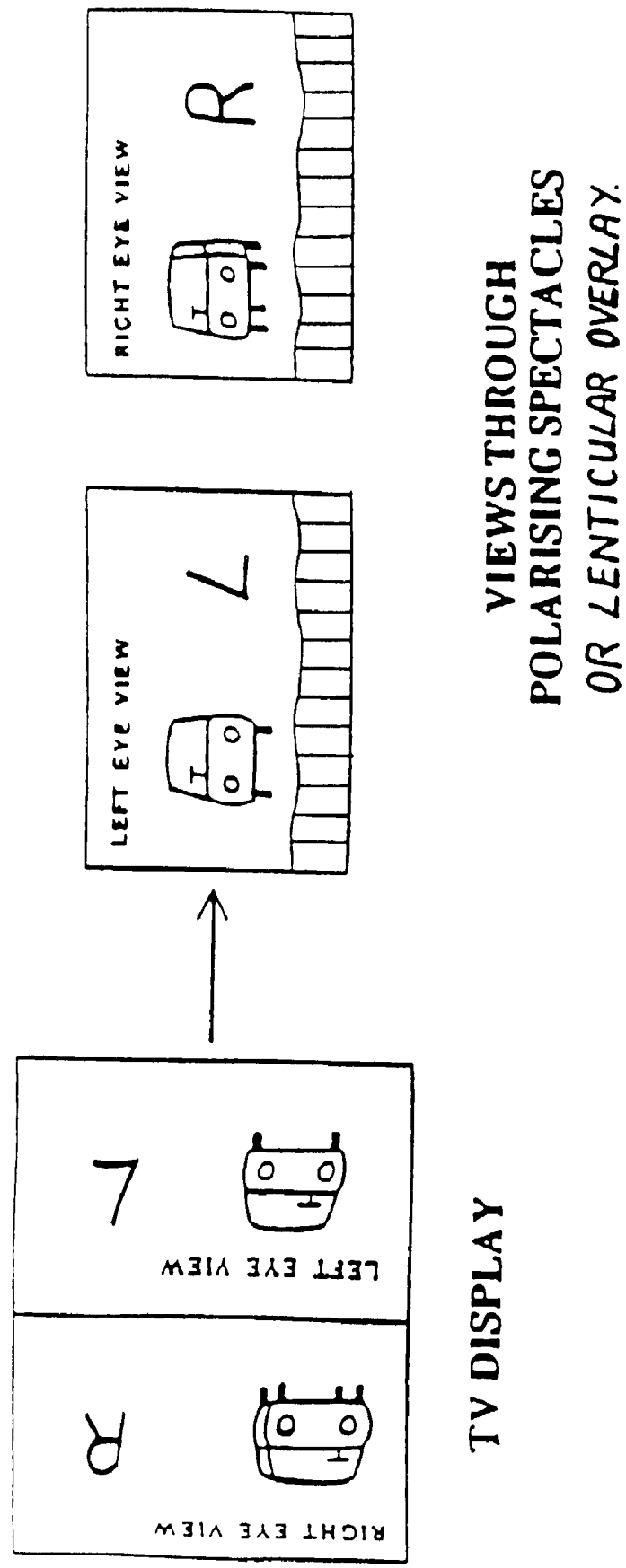
FIG. 6 shows how a television or monitor display can be viewed through polarising spectacles or a lenticular overlay, and should be considered in relation to FIG. 5.

FIG. 6 shows self-explanatory views of a television display through polarising spectacles or a lenticular overlay. The vertical strips at the bottom represent reassembled picture elements where the re-orientation of the images has been implemented in the manner of FIG. 5.

Figure 7:
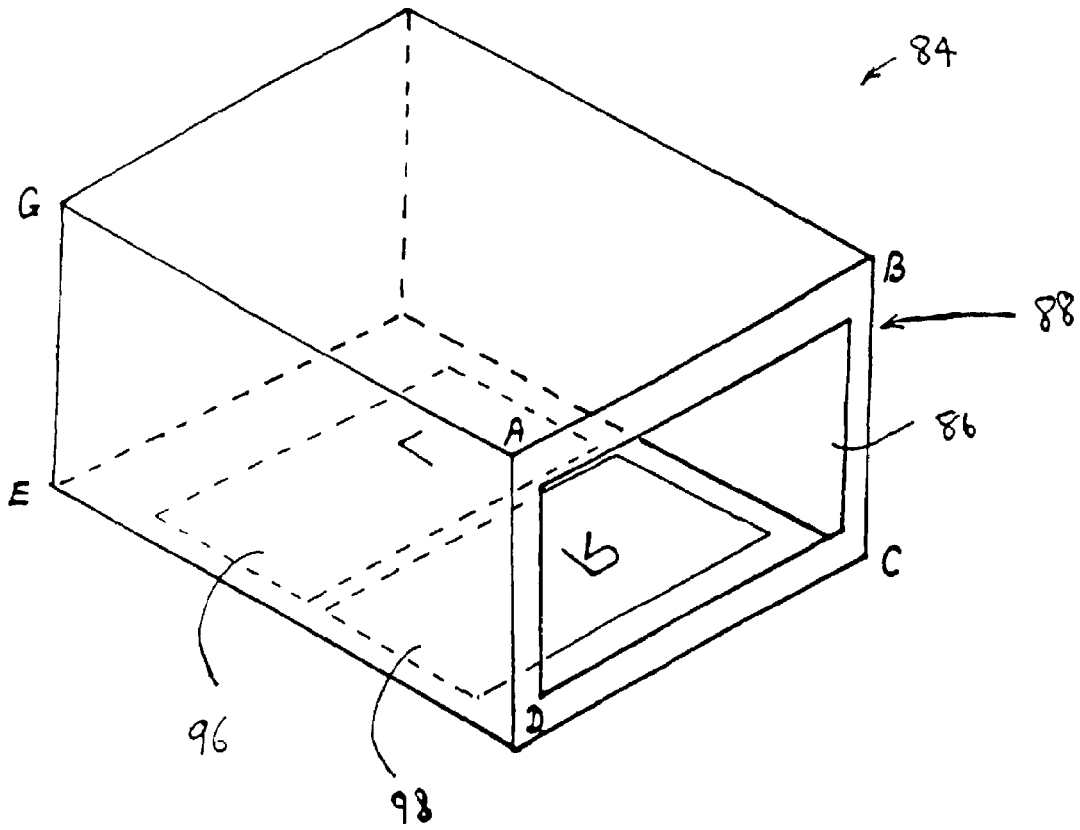
FIG. 7 shows part of sixth apparatus of the invention for the optical manipulation of a pair of landscape stereoscopic images, and is in principle a component part of FIG. 2.
Figure 8:
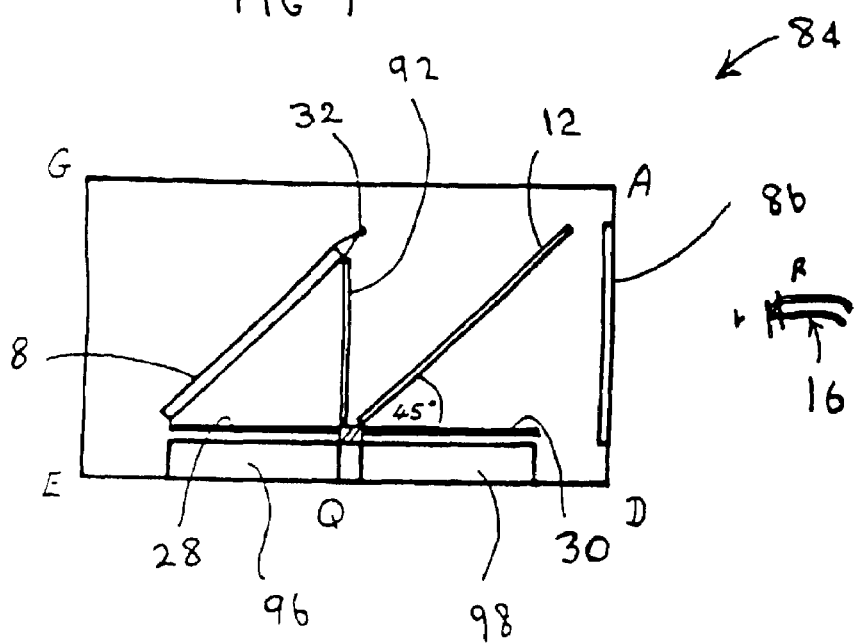
FIG. 8 is a side sectional view of the apparatus shown in FIG. 7.

Referring now to FIGS. 7 and 8, there is shown apparatus 84 for the optical manipulation of a pair of landscape stereoscopic images. The apparatus 84 comprises a viewing window 86 covered by anti-reflection coated glass or plastic. In other respects the construction is a component part of FIG. 2 where the viewing face anti-reflection coated glass or plastic comes later, and the image source may differ. An enclosure 88 is preferably matt black on its inside. A filter 28 is provided for circular polarisation, a filter 92 is provided for linear polarisation, and a filter 30 is also provided for linear polarisation. The filter 30 may be omitted if desired but its presence helps to balance brightness.

A liquid crystal thin film transistor panel 96 displays a mirror image of the left eye picture. A liquid crystal thin film transistor panel 98 displays a mirror image of the right eye picture. The panels are linked in the manner of a "video wall" to form a single screen having two halves. A conventional monoscopic video picture applied to the combination would be displayed with half of its area on each panel.

A mirror 12 transmits and reflects light equally when at 45%.

Polarising spectacles 16 are employed as shown. The arrangement of panel polarisation and polarising filters is such that the polarisation of each image is mutually exclusive. Each eye can only see the appropriate picture.

A hinge 32 is employed for precise setting of the angle of the mirror 8 for vertical alignment of the two images. An alternative method would be to slide the panel 98 forwards or backwards horizontally, as seen through the viewing window 86.

In a further modification of the apparatus 84, the panels 96, 98 may be a single large panel.

It is to be appreciated that the embodiments of the invention described above with reference to the accompanying drawings have been given by way of example only and that modifications may be effected. Thus, for example, the apparatus 82 in the form of the endoscope shown in FIG. 4 could operate in an inverted manner in which the right eye channel would be the straight channel.

The invention claimed is:

1. Apparatus for the optical manipulation of a pair of landscape stereoscopic images, which apparatus comprises an enclosed housing, three ports in the housing with one port forming a photographic interface and the other two ports forming a human interface, said ports allowing light to pass from the human interface to the photographic interface for camera recording, or from the photographic interface to the human interface for each eye of a human without image inversion between the photographic interface and the human interface; said apparatus being characterised by only four reflective surfaces which direct light along three mutually perpendicular directions, each of said surfaces having an edge lying on a flat common plane, said plane also including a division line between adjacent landscape stereoscopic images presented at one said interface, such that light emerges from one said interface in a direction parallel to that of light entering the other said interface, whereby the apparatus causes the landscape stereoscopic images which are side by side with a left eye image left of a right eye image and with the shortest dimension of the landscape images adjacent and which are the human interface to become stacked one image above the other at the photographic interface.

2. Apparatus according to claim 1 and including a first optical path for conveying a first one of the landscape stereoscopic images, and a second optical path for conveying a second one of the landscape stereoscopic images.

3. Apparatus according to claim 2 in which the four reflective surfaces re-orientate one of the landscape stereoscopic images such that the landscape stereoscopic images are side by side left eye image on the left in landscape format at a first end of the first and the second optical paths, such that the landscape stereoscopic images are on top of one another at a second end of the first and the second optical paths, and such that the landscape stereoscopic images are the same way up as each other at the first and second ends of the first and the second optical paths.

4. Apparatus according to claim 3 in which the four reflective surfaces sequentially reflect at least one of the landscape stereoscopic images, in which a first one of the reflective surfaces reflects one of the landscape stereoscopic images upwardly, a second one of the reflective surfaces reflects the image from the first reflective surface towards the second end of the first and the second optical paths, a third one of the reflective surfaces reflects the image from the second reflective surface towards and above the one of the landscape stereoscopic images that has not been re-orientated, and a fourth one of the reflective surfaces reflects the image from the third reflective surface towards the second end of the first and second optical paths and parallel with and above the one of the landscape stereoscopic images that has not been reorientated.

5. Apparatus according to claim 2 and including a coherent bundle of optical fibres in one or both optical paths.

6. Apparatus according to claims 1 in which the four reflective surfaces sequentially reflect at least one of the landscape stereoscopic images.

7. Apparatus according to claim 1 in which the four reflective surfaces are four prism surfaces.

8. Apparatus according to claim 1 and which is in the form of an endoscope.

\* \* \* \* \*